(12) United States Patent
Lagana et al.

(10) Patent No.: US 6,616,901 B1
(45) Date of Patent: Sep. 9, 2003

(54) APPARATUS FOR POLLUTION CONTROL IN EXHAUST GAS STREAMS FROM FOSSIL FUEL BURNING FACILITIES

(75) Inventors: Vincenzo Lagana, Milan (IT); Felix E. Spokoyny, Costa Mesa, CA (US)

(73) Assignee: Hera, LLC, Lake Forest, CA (US)

( * ) Notice: Subject to any disclaimer, the term of this patent is extended or adjusted under 35 U.S.C. 154(b) by 0 days.

(21) Appl. No.: 09/598,348

(22) Filed: Jun. 21, 2000

Related U.S. Application Data

(62) Division of application No. 09/173,959, filed on Oct. 16, 1998, now Pat. No. 6,093,380.

(51) Int. Cl.⁷ ............................. C01C 1/00; C01C 1/02; C01C 1/07; C01C 1/08
(52) U.S. Cl. ...................... 422/148; 422/188; 422/234; 422/242
(58) Field of Search ................................ 422/148, 188, 422/189, 194, 234, 235, 242; 96/155, 234

(56) References Cited

U.S. PATENT DOCUMENTS

| | | | | | |
|---|---|---|---|---|---|
| 3,900,554 A | * | 8/1975 | Lyon | .......................... | 423/235 |
| 4,064,219 A | * | 12/1977 | Yamashita et al. | ...... | 423/243.02 |
| 4,087,513 A | * | 5/1978 | Schell | ...................... | 423/437.1 |
| 4,220,635 A | * | 9/1980 | Schell | ........................ | 423/358 |
| 4,235,816 A | * | 11/1980 | Lagana et al. | ................. | 564/72 |
| 4,507,269 A | * | 3/1985 | Dean et al. | .................. | 423/235 |
| 4,602,673 A | * | 7/1986 | Michelfelder et al. | ......... | 165/7 |
| 4,636,370 A | * | 1/1987 | Dean et al. | ................... | 423/235 |
| 5,024,171 A | * | 6/1991 | Krigmont et al. | ............ | 110/345 |
| 5,029,535 A | * | 7/1991 | Krigmont et al. | ............ | 110/345 |
| 5,034,030 A | * | 7/1991 | Miller et al. | ................... | 95/279 |
| 5,096,599 A | * | 3/1992 | Granelli | ....................... | 210/750 |
| 5,104,629 A | * | 4/1992 | Dreschler | ................ | 423/239.1 |
| 5,240,688 A | * | 8/1993 | von Harpe et al. | .......... | 423/235 |
| 5,252,308 A | * | 10/1993 | Young | ......................... | 423/358 |
| 5,281,403 A | * | 1/1994 | Jones | .......................... | 423/235 |
| 5,399,325 A | * | 3/1995 | von Harpe et al. | .......... | 423/235 |
| 5,399,755 A | * | 3/1995 | Lagana | .......................... | 564/63 |
| 5,543,123 A | * | 8/1996 | Hofmann et al. | ............ | 423/235 |
| 5,555,718 A | * | 9/1996 | Anderson et al. | .............. | 60/783 |
| 5,567,226 A | * | 10/1996 | Lookman et al. | ................. | 95/3 |
| 5,827,490 A | * | 10/1998 | Jones | ....................... | 423/239.1 |
| 5,985,224 A | * | 11/1999 | Lagana | ........................ | 423/235 |

FOREIGN PATENT DOCUMENTS

| | | | |
|---|---|---|---|
| JP | 2-191528 | * | 7/1998 |
| WO | WO 98/42623 | * | 10/1998 |

* cited by examiner

Primary Examiner—Jerry D. Johnson
Assistant Examiner—Alexa Ann Doroshenk
(74) Attorney, Agent, or Firm—Howard E. Sandler

(57) ABSTRACT

This invention relates to pollution control requirements for fossil fuel burning facilities such as power plants, and, more particularly, to an apparatus for providing a safe and economical supply of ammonia, from a urea feedstock, when ammonia is desired or necessary to initiate, cause and/or supplement the removal of one or more pollutants from an exhaust gas stream.

9 Claims, 2 Drawing Sheets

APPARATUS FOR POLLUTION CONTROL IN EXHAUST GAS STREAMS FROM FOSSIL FUEL BURNING FACILITIES

RELATED APPLICATIONS

This Application is a Division of U.S. patent application Ser. No. 09/173,959, filed Oct. 16, 1998 now U.S. Pat. No. 6,093,380.

BACKGROUND OF THE INVENTION

Much of the electrical power used in homes and businesses throughout the world is produced in power plants that burn a fossil fuel (i.e. coal, oil, or gas) in a boiler. The resulting hot exhaust gas (also sometimes termed "flue gas") turns a gas turbine or boils water to produce steam, which turns a steam turbine, and the turbine cooperates with a generator to produce electrical power. To achieve good thermal efficiency for the power plant, the hot exhaust gas flows from the boiler through a heat exchanger (also sometimes termed an "air preheater") in which the air input flow to the boiler is preheated. The partially cooled exhaust gas is directed to the exhaust stack.

An important consideration for modern power plants is the cleanup of the exhaust gas. The exhaust gas produced in the boiler contains gaseous pollutants such as nitrogen oxides ("NOx") and sulfur oxides ("SOx"), as well as particulates termed "fly ash". Environmental laws establish permissible levels of gaseous pollutants and particulates that may be emitted from the exhaust stack of the plant. Various types of pollution-control equipment are therefore available to reduce the levels of gaseous pollutants and particulates from the exhaust gas before it reaches the exhaust stack. For example, among other methods, NOx is often removed by selective catalytic reduction (SCR) and/or selective non-catalytic reduction SNCR, and fly ash is often removed by an electrostatic precipitator (ESP) and/or a baghouse. The invention herein deals with those particular pollution control systems which utilize ammonia within the process in order to initiate, cause and/or supplement the process.

SCR is the catalyst mediated reduction of NOx with ammonia and provides the highest NOx removal efficiency of all NOx control technologies. In this process, ammonia is injected into the flue gas as a reagent for reducing NOx. On the catalyst surface absorbed ammonia reacts with NOx to form molecular nitrogen and water vapor:

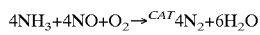

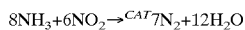

NOx reduction efficiencies of up to 95% are possible with a properly tuned and sized conventional SCR system on a boiler and, in this regard, in many situations, SCR is often the preferred and/or the only practical technology available to provide compliance within the parameters established by the applicable emission control laws. Other SCR bases NOx reduction technologies of the type described above are used in so-called staged systems (i.e. SNCR used in conjunction with in-duct SCR and/or air preheaters having catalyzed heat transfer elements) and SCR for combined and simple cycle gas turbine applications. In all such instances, a key ingredient in the system operation is the safe, economic and reliable availability of ammonia Other pollution control systems used in power plants, and heavy industry applications, which require the heavy utilization of ammonia, include: injection of ammonia for flue gas conditioning to assist in the removal of fly ash (see U.S. Pat. Nos. 4.064,219, 5,034,030, and 5,567,226); ammonia injection in situations where the fuel is a high sulfur content coal or oil which cause a so called "blue plume" because of excessive $SO_3$ (in such situations the ammonia usage reduces the blue plume by removing excessive $SO_3$ by formation of ammonium sulfate and bisulfate, see U.S. Pat. No. 5,024,171); ammonia based SNCR systems (see U.S. Pat. Nos. 3,900,554, 4,507,269, and 4,636,370); and in conjunction with SCR systems applied in combined cycle combustion turbines. Once again, a key driving ingredient in all such systems is the safe, economic and reliable availability of ammonia.

Ammonia for uses such as described above, are generally delivered to power plants in the form of anhydrous ammonia, or aqueous ammonia. Anhydrous Ammonia is used in massive quantities world-wide for many industrial and agricultural purposes. Ammonia is gas at ambient temperatures and pressures, and is normally shipped and stored as a liquid, either in pressure vessels at ambient temperature, and high pressure (i.e. over 16 bars), or in refrigerated vessels at ambient or nearly ambient pressure, and at about −33° C. It is transported in bulk in ships, barges, and railroad tank cars, and in tank trucks on public roads and highways. It is frequently stored in large quantities at industrial sites in populated areas and is frequently used as the working fluid in large refrigeration systems. It is now coming into wider use for the removal of NOx from flue gas at power generating stations in urban areas.

Anhydrous ammonia is an extremely hazardous, toxic, and volatile material. In the event of an accidental discharge, it can cause immediate death to humans and animals and rapid death to trees and plants. Both anhydrous liquid ammonia, and concentrated aqueous liquid ammonia, display a deadly characteristic which substantially increases the risk of widespread injury and death in case of a spill. Specifically, upon sudden release to the atmosphere, as might occur in a sudden and accidental discharge (i.e. a storage failure at a power plant, a train wreck, or a traffic accident), the ammonia forms a cloud produced of an aerosol fog of liquid ammonia droplets. Unlike gaseous ammonia, which, though toxic, is lighter than air and quickly dissipates to harmless concentrations, the cloud can persist for a surprisingly long time, as long as several hours, before it finally disappears. The cloud is typically heavier than air and tends to drift along the surface of the earth, i.e., the ground or the surface of a body of water. The cloud moves with the wind and can sweep over a total area, i.e., a "footprint," much larger than the area covered by the cloud at any one moment. Contact with the cloud is instantly incapacitating, and a single breath can be fatal. Substantial numbers of bulk shipments of anhydrous ammonia routinely move through or near densely populated areas. It is estimated that an anhydrous ammonia spill from a 40,000 pound truck trailer would generate a cloud having an average lethal footprint of 29 acres, that is, an area of 29 acres in which the concentration of ammonia would reach a lethal level, about 0.5 percent, before the cloud eventually dissipated. Although this is an extreme example, it is interesting to note that a large SCR installation with ammonia demands of 3,000 pounds per hour, and a 5 day supply of ammonia reserve supply, will require on-site storage of approximately 360,000 pounds of this very toxic, volatile, and difficult to handle chemical.

In addition to the inherent danger of storing, transporting and handling large quantities of ammonia, the expense insofar as safety aspects, insurance costs, specialized training, and the difficult to quantify emotional exposure of living and working next to a such potential catastrophe, it is apparent that if another, less hazardous commodity could be transported instead of ammonia, and then be readily converted back to ammonia, the hazards associated with ammonia shipment and handling would be considerably reduced. To some extent, attempts have been made in the supply of ammonia for NOx control in power plant environments by substituting concentrated aqueous liquid ammonia for anhydrous ammonia. Such a solution has achieved only limited success, due to any number of factors, for example: the high energy cost of vaporizing the water carrier, relatively costly storage facilities; and, even though aqueous ammonia is safer to handle than anhydrous ammonia, it is still very difficult and costly to handle in a safe manner.

Urea is an ideal candidate as an ammonia substitute. Urea is a non-toxic chemical compound and, for purposes of this discussion, presents essentially no danger to the environment, animals, plant life and human beings. It is solid under ambient temperatures and pressures. Consequently, urea can be safely and inexpensively shipped in bulk and stored for long periods of time until it is converted into ammonia. It will not leak, explode, be a source of toxic fumes, require pressurization, increase insurance premiums, require extensive safety programs, or be a concern to the plant, community and individuals who may be aware of the transportation and/or storage dangers of ammonia. Furthermore, by means of the present invention, urea can be used to produce gaseous ammonia:

on-site on-demand with rapid response time with maximum turn down availability with utmost safety with significant economies with automatic operation with low maintenance The present invention fulfills this very serious need for providing a safe, economical and dependable supply to fossil fuel burning facilities, such as power plants, to assist in the control of $NO_x$, $SO_3$ and particulate pollutants therefrom.

SUMMARY OF THE INVENTION

The invention herein teaches the production of ammonia on-site and on-demand from a safe, benign urea feed stock. A rich urea solution is fed to a hydrolyzer assembly. The hydrolyzer assembly is operative to produce a gaseous mixture containing ammonia and $CO_2$ and water vapor, as well as a lean solution of urea. The lean urea solution is recycled (a more or less closed loop system insofar as the urea solution), for intermixing with the rich urea solution, followed by the hydrolysis step, and so on. The ammonia containing gaseous mixture is drawn from the hydrolyzer as required for use in the various pollution control systems. Because the lean urea solution is recycled within this very closed system, there is no waste to content with. Furthermore, because the pollution control systems for which the ammonia is required are from large fossil fuel burning sources, emitting flue gas which already contains very large quantities of $CO_2$ and $H_2O$, the relatively small additional quantities of $CO_2$ and $H_2O$ present in the gaseous mixture produced by the urea hydrolysis, are of no significance in overall scheme of things.

The search for a safer, simpler, and less expensive alternative to ammonia has been going on for quite some time. Indeed, there have even been attempts to use a urea feedstock for ammonia requirements in fossil fuel burning applications, such as in electrical generation facilities. In this regard, the reader is referred to U.S. Pat. Nos. 4,220,635, 5,252,308, 5,281,403, 5,240,688, 5,399,325, 5,543,123, and Japanese Patent No. HEI 2-191528, all of which addressed the considering urea as a feedstock for conversion to ammonia. Nevertheless, all of these prior attempts suffered from one or more very serious deficiencies, for example: some prior systems depended on expensive and yet to be proven catalysts to promote the conversion of urea to ammonia; most of the prior attempts were single pass systems, which could produce large quantities of waste which had to be further processed, or otherwise required significant steps and/or energy to operate the system; some of the systems produced other chemical contaminants which could not be discharged into the atmosphere without treatment, or, if injected into the flue gas, might result in catalyst poisoning and/or secondary pollutants; and the like.

In addition to the above patents, U.S. Pat. No. 5,827,490 has issued recently. This patent, which is a continuation of an abandoned application, which in turn was a division of an abandoned divisional application of the above mentioned U.S. Pat. No. 5,281,403, suffers from some of the same deficiencies as are discussed immediately above. Furthermore, the '490 Patent is generally drawn to arrangements wherein the reaction products of the urea hydrolyzation are maintained in the liquid phase, primarily for subsequent injection for SNCR applications. In one embodiment, the liquid is flashed to produce ammonia vapor for end uses requiring ammonia; however, because the teachings of the patent require maintaining the reaction products in a liquid phase, the '490 system is not at all appropriate for producing gaseous ammonia on demand for large scale needs, such as SCR requirements. Pressure requirements for large volume production with the '490 system are not practical, nor readily achievable.

The '403 patent, as well as U.S. Pat. Nos. 4,168,299 and 5,252,308, were all used as anticipatory references in the International Search Report which was included with the recently published International Publication Number WO 98/42623. The '623 International Application is cumulative of prior art discussed above, and is of no additional significance with respect to the subject invention. The '623 International Application is drawn to a batch type once thru system. In FIG. 2, an overflow is illustrated; however this overflow is passive in nature (i.e. a measure to prevent over-fill conditions), and is not tied to process parameters, nor are measures addressed concerning rectifying problems when recirculating a solution containing ammonia suspended therein.

The basic parameters of a hydrolysis system for converting urea to ammonia has been known for many years. One of such prior systems can be seen in applications for handling waste solution in ammonia/urea manufacturing plants (see U.S. Pat. Nos. 5,399,755 and 4,235,816). In this regard, in such a manufacturing facility (which often costs in excess of $500 million dollars), natural gas is processed into Ammonia and $CO_2$ in a first stage and thereafter, ammonia with the addition of $CO_2$ is then further processed to produce urea. During a latter stage of the urea production, a waste stream of weak urea solution, and other contaminants, for which it is not appropriate to continue for the production of high quality urea, is passed through a hydrolyzing process and stripping tower for reduction of the contaminants in solution to a very low percentage (i.e. lower than 1 ppm), and that the "purified" solution can be discharged or used as feed water. The hydrolyzer also produces ammonia and $CO_2$, which may be reused in the production of urea. While this process is used successfully in many installations of urea production facilities, it does not in any manner describe or anticipate the invention herein, either alone or in reasonable combination. Indeed, this prior process is not a closed-loop system in the sense of the invention herein, nor does it anticipate the fact that the resultant weak solution can still retain a relatively substantial content of urea solution, nor is there any teaching therein of the utilization of a urea to ammonia hydrolysis process for the purpose of on-demand, on-site production of ammonia for SCR and FGC uses in fossil fuel burning facilities.

Other features and advantages of the invention will become readily apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
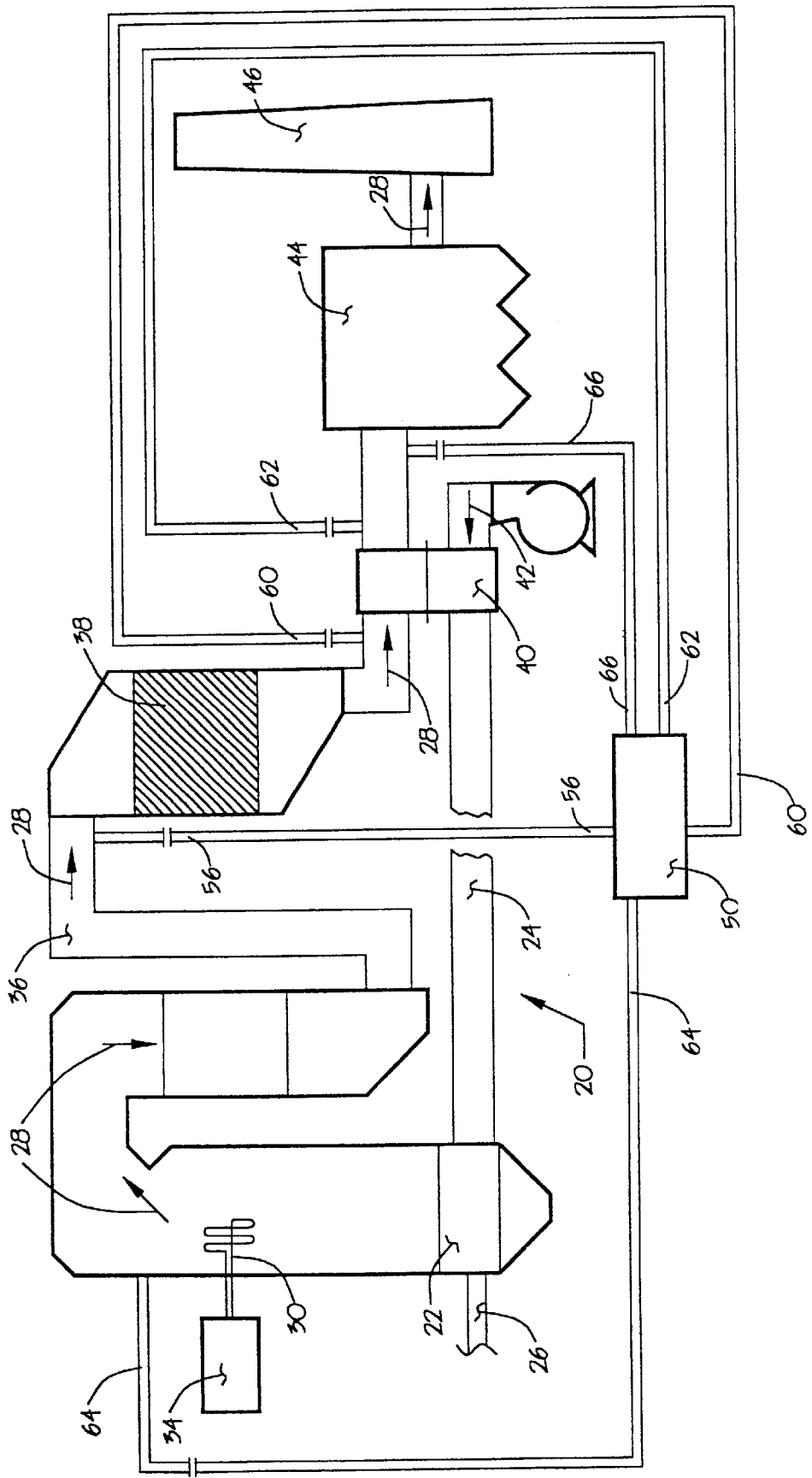
FIG. 1 is a schematic representation of a fossil fuel burning power plant which incorporates the principles of the present invention.

FIG. 1 schematically illustrates a fossil fuel burning power plant 20 utilizing the apparatus and method of the present invention therewithin. Briefly, the power plant 20 has a combustor/burner 22, which is supplied preheated air through inlet duct 24, and fuel through fuel inlet 26. The fuel is combusted with air, producing a flue gas flow 28. The flue gas flow 28 contains $NO_x$, and $SO_x$ gaseous pollutants, particulate pollutants (sometimes referred to as flyash), and also other combustion products. The flue gas flow heats water flowing in boiler tubes 30, and converts the water to steam. The steam is supplied to a turbine/generator 34, which produces electric power.

Flue gas flows through the primary flue gas duct 36 and, as shown, through a traditional selective catalytic reduction (SCR) system 38 for the reduction of $NO_x$ from the flue gas stream. The flue gas flow 28 then passes through a heat recovery apparatus 40 (referred to hereinafter as air preheater 40), wherein heat is transferred to an incoming air flow 42, to provide preheated air flow through conduit 24. After leaving the air preheater 40, the gas flow 28 enters an electrostatic precipitator 44, in which a large fraction of the flyash is removed by application of electrostatic fields the flue gas passing through the precipitator. Although not illustrated, another well known arrangement for removing particulate from flue gas stream, is a baghouse, wherein the particulate in the flue gas stream passing therethrough is collected on the surfaces of filter bags contained therein. The "cleansed" flue gas then flows through an exhaust stack 46 for discharge to the atmosphere.

The discussion of the power plant 20 is intended to be highly schematic in nature, and to provide the information and background necessary to understand, practice and enable the present invention. In an operating power plant, there are typically many other system, as well as alternative systems, that are not shown here. The present invention is compatible with such other systems and may, wherever applicable, be used with them.

The apparatus and method of the present invention includes an on-site, on-demand, urea to ammonia system 50 which is operative to be responsive to pollution control demands of the power plant to provide ammonia, as required, to promote, supplement and/or enhance various pollution control schemes. In this regard, a traditional SCR system, such as is schematically illustrated at 38, utilizes ammonia in the presence of a suitable catalyst, for example a vanadium pentoxide based catalyst, to reduce $NO_x$ in the flue gas flow 28, to free nitrogen and water. Traditional SCR systems are well known in the art and no further description is necessary herein for a full understanding of the invention herein to one skilled in the relevant art. It is to be noted, however, that in addition to traditional SCR systems, other non-traditional SCR systems, such as in-duct SCR systems, not shown, (see U.S. Pat. No. 5,104,629), SCR in HRSG for gas turbines, not shown, (see U.S. Pat. No. 5,555,718), as well as air preheaters 40 which incorporate catalyzed surfaces in the heat transfer elements thereof (see U.S. Pat. No. 4,602,673), also have requirements for ammonia use in the same manner as the traditional SCR systems. FIG. 1 schematically illustrates feeds of gaseous ammonia to SCR system 38, and the air preheater 40, from supply lines 56 and 60, which respectively communicate therebetween and the system 50.

Ammonia requirements to assist in pollution control efforts in power plants such as plant 20 are not limited to demands for SCR systems. In this regard, providing ammonia for flue gas conditioning, in order to enhance the collection efficiency of an electrostatic precipitator 44, is well known in the art (see U.S. Pat. No. 5,029,535), or for assisting in the control of excess $SO_3$ (see U.S. Pat. No. 5,024,171), or for assisting in the enhancement of the collecting efficiency of baghouses (the baghouse is not shown in FIG. 1; however, the concept for ammonia conditioning is discussed in U.S. Pat. No. 5,034,030. FIG. 1 schematically illustrates supply lines 62 and 66 for the supply of gaseous ammonia for the above described precipitator(or baghouse) efficiency enhancement, and assisting in the collection of excess $SO_3$, respectively. In addition to SCR, in certain situations it may be appropriate to deliver ammonia for SNCR applications (see U.S. Pat. No. 3,900,554, for a basic description of SNCR), rather than direct UREA injection and, in this regard, a gaseous ammonia feed line 64 is schematically illustrated in FIG. 1 as communicating between the system 50 and the boiler 22.

Figure 2:
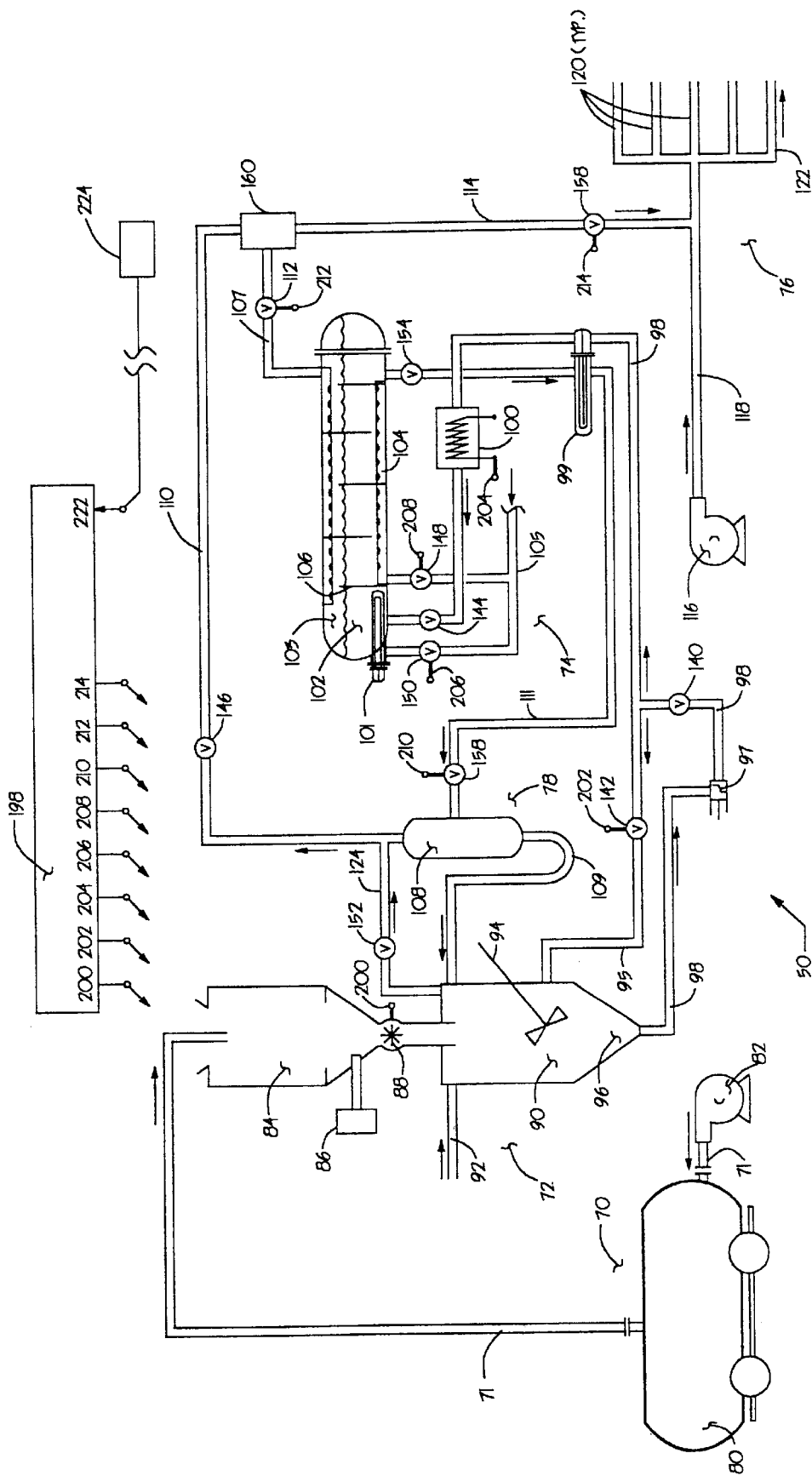
FIG. 2 is a schematic representation of an on-site, on-demand urea to ammonia hydrolysis system constructed in accordance with the principles of the present invention, and which is of the type to generate ammonia for use in relevant pollution control activities of the power plant illustrated in FIG. 1.

As best shown in FIG. 2, the on-site, on demand, urea to ammonia system 50 comprises: a urea handling section 70, which communicates with a dry urea source (i.e. railcars, super sacks, and the like), for unloading and storage of urea for subsequent use in the system 50; a urea dissolver section 72 for taking a dry urea, such as a prill or granular urea, from facility 70, and dissolving it in water to create a rich urea solution; a hydrolyzer section 74 for hydrolyzing such rich urea solution, at an elevated temperature and pressure, to produce a gaseous mixture which includes gaseous ammonia; a dilution and distribution section 76 which dilutes such gaseous ammonia with air, and distributes it, on an as required basis, to assist or promote pollution control measures; and a recirculation section 78 which recirculates a lean urea solution which is discharged from hydrolyzer section 74, all in a manner and for a purpose as is described hereinafter.

The preliminary handling of urea can be in any suitable manner and, to some extent, is dictated by the form of delivery of the urea to the power plant. Urea can be delivered in a variety of benign forms (i.e. dissolved in water, prill urea and granulated urea). In most instances of larger urea consumption, working with a prill urea in the first instance is the most economical and the exemplary urea handling section 70 is primarily designed for handling prill urea from a rail car 80. System 70 comprises an unloading blower 82 for transporting prill urea from the rail car 80 through conduit 71 into a silo 84. A source of dry air 86 is provided at the silo 84 for alleviating caking concerns, as well as to provide transfer to other storage silos (not shown), as required. A suitable valve, such as the schematically illustrated rotary valve 88 is adapted to receive a suitable process signal to meter out the quantity of prill urea directed to the urea dissolver section 72.

The urea dissolver section 72 may be of any suitable configuration and, as shown in FIG. 2, comprises a mixing/dissolving tank 90, which receives water therein from any suitable source (shown as boiler condensate water from feed line 92), and uses the assistance of mixer 94, to dissolve the dry urea into a rich urea solution. For purposes of this invention, a rich urea solution will generally be in the range of 20 to 60% urea to water in solution, and preferably in the range of 30 to 50%. A suitable density measuring instrument 96 is provided to determine the urea concentration. The density measuring means may be of any suitable type and, if preferred, other type of measurements, which are indicative of the urea concentration in the water solution, may be included instead of density measuring instrumentation, or as a check or supplement thereto. Suitable means are provided to maintain the temperature of the solution in the tank 90 to at least 35° C., in order to promote dissolving of the prilled urea, supply heat to support the endothermic reaction, and also to prevent crystallization within the urea solution.

A suitable pump 97 communicates with the dissolver tank 90 to pump the rich urea solution from the tank 90, through conduit 98 having a check valve 140 disposed therein, and into the hydrolyzer chamber 102 of the hydrolyzer section 72. It is recommended that a redundant pump 97 (not shown) also be included to better insure system availability. As illustrated a circulation conduit 95 is in valved communication with conduit 98, to selectively direct a portion of the rich urea mixture back to the tank 90, when downstream system urea demand lessens. The hydrolyzer chamber 102 operates at a temperature and pressure range of 180 to 250° C. and 15 to 50 bar, respectively, in order to promote the hydrolysis of the urea into $NH_3$ and $CO_2$, in accordance with the following formula:

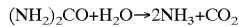
$$(NH_2)_2CO+H_2O \rightarrow 2NH_3+CO_2$$

The gaseous mixture containing ammonia, $CO_2$, and water vapor, rises to a space 103 in the top of the chamber 102, and is withdrawn therefrom through conduit 107 and used thereafter in a manner as described hereinafter. A suitable heater, shown schematically as electric heater 100, which is positioned in line with conduit 98 and which is shown as having a check valve 144 upstream thereof, is provided to heat the rich urea mixture to the proper process temperature for urea hydrolysis. The heater 100 may be of any suitable construction; however, it is suggested that it incorporates a modular design, having excess capacity, for continuous operation in instances of module failure or change-out. The choice of the manner of heating the rich urea solution is merely one of preference, availability and economics. In instances where the comparable cost of high pressure steam is less than the cost of electricity, a steam heating arrangement may be used instead of, or in conjunction with the electric heater 100 (For example, steam coils, such as steam heating coils 101, can be positioned within the hydrolysis chamber 102. It is to be noted that the schematic inclusion of both steam coils 101, and of electric heater 100, are illustrated primarily for discussion purposes, for it is unlikely that both coils 101 and heater 100 would both be included in an operational embodiment of the system 50 of the present invention).

Sparging steam is additionally provided to the hydrolyzer chamber 102, at the sparging manifold 104, in order to promote the stripping out of ammonia and $CO_2$ hydrolysis products from the urea solution passing through the chamber 102. The steam for sparging, as well as for steam heating coils 101, can be supplied from any suitable source, for example from available plant steam and, as shown, is directed to coils 101, and manifold 104, via a valved steam conduit 105.

The broad concept of urea hydrolysis is a well known concept and a detailed description thereof is not believed to be necessary to those skilled in the art of this invention. The approach of urea to ammonia hydrolysis systems used heretofore, often followed one of two arrangements:

A. Urea hydrolysis for waste water clean up in a urea manufacturing situation (i.e. See U.S. Pat. Nos. 5,399,755, 4,087,513, and 5,096,599), in which instance the installations of this sort were very expensive and complicated in order to decrease the content in the lean waste urea solution to very trace amounts (i.e. 1.0 ppm), so that the waste solution could be discharged. The philosophy behind this sort of system is not applicable to the present invention, for it requires extremely expensive equipment, significant space requirements, process complications, control and maintenance expenses, and the like. These are once thru systems, and the lean solution is not reused in the process (as in the present invention) via flashing and recirculation.

B. Urea hydrolysis for certain on-demand uses and/or SNCR (i.e. see U.S. Pat. Nos. 5,240,688, 5,543,123, 5,281,403, and Japanese Patent No. HEI 2-191528). In all of these systems, urea hydrolysis (which is generally illustrated using a catalyst), is done as a once through process. The once thorough scenario can result in additional products of decomposition being formed which: may be less active than gaseous ammonia; may result in residual deposits being formed; may have a tendency to poison the catalyst when dealing in SCR applications; and may result in fouling at the nozzles and air preheater. Furthermore, the efficiency of a once thru system may indeed be significantly less than the urea to ammonia system of the present invention. To the best of applicant's knowledge, systems constructed in accordance with prior art teachings, such as in the patents cited above, have never been commercially successful in the areas of the present invention.

The present invention recognizes the deficiencies of the prior art systems, as well as the needs for gaseous ammonia in power plant environments, and incorporates an hydrolysis process which operates in an efficient manner to produce a gaseous mixture, which includes ammonia, as well as $CO_2$ and water vapor; however, the $CO_2$ and water vapor are introduced in the flue gas stream in insignificant quantities from a power plant environmental prospective. Further, the system of the present invention does not produce significant quantities of lesser active nitrogenous compounds (from a $NO_x$ reduction prospective), as other urea based systems may have a tendency to do.

The chamber 102 is divided into a plurality of cells by baffles 106, which are arranged to present a tortuous path to assist in the promotion of hydrolysis and stripping. In the present invention, in addition to the gaseous products of hydrolysis being formed within the chamber 102, the concentration of urea in solution is reduced from the rich inlet concentration of 20 to 60% (preferably in the range of 30 to 50%), to a lean outlet concentration of 1 to 15% (preferably in the range of 3 to 10%). It is important in the invention herein that the hydrolysis of the rich urea solution occurs at a pressure and temperature within the hydrolyzer chamber be such that the primary components of the gaseous mixture produced are ammonia and $CO_2$ (water vapor will also be present in such gaseous mixture), to the exclusion of excessive amounts of other possible products of incomplete hydrolysis, such as cyanuric acid, iso-cyanic acid, ammonium carbonate, ammonium bicarbonate, and the like. Although some of such other components may be effective in reducing NOx, in most instances they will not be as effective as ammonia, thus causing the process operation to be more costly. Furthermore, such other components may have deleterious effect on components of the power plant downstream therefrom, for example: poisoning of SCR catalyst, plugging of the catalyst substrate, fouling of air preheater elements, and the like. To achieve the preferred balance of the system, and to also to promote the generation of ammonia, it is highly preferred that the aforementioned temperature and pressure operational parameters, be maintained (hydrolyzer chamber 102 operating at a temperature and pressure range of 180 to 250° C. and 15 to 50 bar, respectively, and preferably 210 to 240° C. and 25 to 40 bar). Depending upon circumstances, a variety of hydrolysis means can be considered for the invention herein (i.e. multistage, thermal, catalytic, or a combination of these).

The lean urea solution is discharged from the chamber 102, and is directed back, through the recirculation section 78. As shown, section 78 comprises: a conduit 111 which includes a check valve 154 therein, which communicates between hydrolysis chamber 102 and a flash separator 108. The lean urea solution in hydrolysis chamber 102 is at a relatively high pressure for, generally speaking, the higher the pressure, the higher is the rate of hydrolysis. Unfortunately, the higher the pressure, the more difficult is the extraction of gas from solution. In this regard, by directing the relatively high pressure lean urea solution to the flash separator 108, the rapid pressure drop causes a resultant release of further gaseous mixture containing ammonia, which is then directed therefrom through conduit 110 which includes a check valve 146 therein. The remaining lean solution exits from the separator 108 through conduit 109, and thence to the dissolver tank 90 for intermixing to be a part of the rich urea solution being created therein. The gaseous mixture in conduit 107 is combined with the gaseous mixture in the conduit 107, which communicates with the space 103 of the hydrolyzer chamber 102. The pressure within the conduit 110 is expected to be in the range of 1.2 to 2 bar and the pressure in the conduit 107 is expected to be much higher, for example, in the range of 25 to 40 bar. Because of this significant differential in pressure, an ejector 160 is provided at the intersection of lines 107 and 110, which is operative to draw the low pressure gaseous mixture from conduit 110 for equalization therein with the higher pressure within the conduit 107. The gaseous mixtures are then combined and directed to downstream process uses via conduit 114. By carrying the gaseous mixture within conduit 114 at a high pressure, the size and expense of the conduit is significantly reduced from a low pressure conduit carrying the same volume of gas.

The recirculating arrangement discussed immediately above is a significant aspect of the present invention, for it: permits the continuing entry of a rich urea solution to thereby promote the production of gaseous ammonia at the peak of the ammonia production vs. residence time curve, (thereby potentially increasing efficiency, reducing equipment size, and cutting power consumption); insures that there is no waste or contaminated fluid to clean up, for the lean solution being withdrawn from the hydrolyzer chamber 102 is completely used, either as a gaseous mixture created at the flash separator 108, or as a remaining, post-flash, lean urea solution added to the dissolving tank 90, via conduit 109 which communicates between tank 90 and flash separator 108; and inhibits the injection of products of decomposition other than $CO_2$ and ammonia.

Conduit 114, carries a gaseous mixture containing a high proportion of ammonia (i.e. 15 to 35 percent by volume), which is too high for most process uses (i.e. ammonia content as a per cent of the air mixture in applications which are fed by conduits 56, 66, 62, and 60 in FIG. 1 would, depending upon particular circumstances, generally be in the range of 3 to 10%, which is significantly below the explosion limit for such a mixture. Accordingly the preferred embodiment herein also incorporates the dilution and distribution section 76, which comprises: a dilution blower 116, which directs dilution air through conduit 118, which is then directed for uses such as discussed hereinabove with reference to FIG. 1. The gaseous mixture containing ammonia in conduit 114, is combined with the dilution air in conduit 118, and is injected into the flue gas stream in any suitable manner, for example via an interface with a manifold 122, from which a plurality of probes 120 communicate into a flue gas duct (not shown in FIG. 2). In instances where the ammonia produced is to be used in SNCR applications, (i.e. see conduit 64 in FIG. 1), dilution may not be required (except to the extent to propel the injected media), and the gaseous mixture containing a relatively high concentration of ammonia can be injected directly into the boiler.

As is evident from the above discussion, the invention herein addresses needs for safety, simplicity, cost and efficiency. In further recognition of the quest for efficiency, a preheater 99 is disposed in the conduit 98 in order to use waste heat of the lean urea solution to preheat the rich urea solution before it enters the hydrolyzer chamber 102. The preheater 99 can be of any suitable type and, as shown, is a liquid to liquid heat exchanger, wherein the high temperature lean urea solution, which is being returned to the dissolving tank 90, transfers heat to the incoming rich urea solution before the rich urea solution enters the chamber 102. Further, insofar as plant comfort, it is noted that simply by the nature of the act of dissolution, a trace amount of gaseous ammonia may be created at the dissolver tank 90, which may of may not (depending upon area, sealing arrangements, and the like) result in a detectable characteristic ammonia odor in the vicinity of tank 90. In this regard, a conduit 124 is shown in FIG. 2 as communicating between the top of the tank 90 and the conduit 110, having a check valve 152 disposed there between. Inasmuch as conduit 110 is at a lower pressure than the tank 90, any gaseous ammonia accumulating in the top of tank 90, will be drawn into line 110, and will be used in the downstream process.

A number of valves and controls may be provided, all in accordance with preferred design parameters. In this regard, there is schematically illustrated a control block 198 which receives and/or sends the following control signals, in response to demand signals 222 received for the ammonia demands of downstream process 224: signal 200, which controls the rotary valve 88 for prill urea feed from the silo 84 to the dissolving tank 90; signal 202 which controls the valve 142 for selectively directing the recirculation flow, if any, of rich urea solution, back to the dissolving tank 90; signal 204, which controls the heater 100 for determining the heat input to the rich urea solution entering the hydrolyzer tank 102; signal 206, which controls valve 150 for steam input to the heating coils in the hydrolyzer tank 102; signal 208, which controls valve 148 for sparging steam in the hydrolyzer 102; signal 210, which controls the valve 158 for the entry of the lean urea return solution into the flash separator 108; signal 212 for the control of valve 112 for the flow of the gaseous products of hydrolysis thru the conduit 107 to the ejector 160; and signal 214 for controlling the valve 158 for the flow of the gaseous mixture for downstream process use.

The above description is for the purpose of teaching a person of ordinary skill in the art, how to practice the invention, and is not intended to detail all of those obvious modifications and variations of it which will become readily apparent to the skilled worker upon reading the description, for example: valved maintenance and drain conduits may be provided at various locations; if economics or preferences dictate that the feed urea/water solution being prepared and delivered in tankers, then the silo 84 and dissolving tank 90 can be dispensed with, so long as an appropriate arrangement for the return of the rich urea conduit 98 is taken into account; the lean solution in conduit 109 leading from the flash separator 108 can recirculate into the rich urea solution, at other locations than is indicated; the dissolving tank 90 can be loaded with prill directly from standard "super sacks" is desired; granular urea can be substituted for prill urea if desired; more or less valves and control points can be provided, if desired; and the like. It is intended, however, that all such obvious modifications and variations will be included within the scope of the present invention, which is defined by the scope of the claims setforth hereinafter.

What is claimed is:

1. An apparatus for the on-site manufacture of a gaseous mixture containing ammonia, from a rich urea solution, derived from a urea feed source, for injection into an exhaust gas stream to assist in the removal of air pollutants therefrom, comprising:

pressurizing means for raising the pressure of a rich urea solution, to a predetermined high pressure rich urea solution;

directing means communicating between such pressurizing means and a hydrolyzer assembly;

said hydrolyzer assembly being operative to progressively hydrolyze a portion of such high pressure rich urea solution to a high pressure gaseous mixture containing ammonia, and to leave a high pressure lean urea solution residue;

delivery means operative to selectively withdraw a portion of such gaseous mixture from said hydrolyzer assembly;

a recirculating conduit in communication with such hydrolyzer assembly recirculating such high pressure lean urea solution residue;

a low pressure expanded volume flash tank interposed in said recirculating conduit in a manner that the high pressure lean urea solution is flashed therein to yield a low pressure gaseous mixture containing ammonia, as well as a low pressure lean urea solution for subsequent recirculation; and combining means operative to combine the low and high pressure gaseous mixtures for subsequent injection into an exhaust gas stream.

2. An apparatus as specified in claim 1 wherein the urea feed source is a dissolver assembly which is adapted to receive a dry urea feed stock, and to dissolve selected amounts of such dry urea in a selected proportion of liquid, to produce such a rich urea solution.

3. An apparatus as specified in claim 2 additionally including second directing means communicating between said dissolver assembly and said combining means, and operative to combine gaseous mixture produced within said mixer assembly, with such low and high pressure gaseous mixtures.

4. An apparatus as specified in claim 1 including first heating means for preheating the rich urea solution to a temperature within a predetermined temperature range, and a second heating means for maintaining the temperature of the urea solution within said hydrolyzer assembly generally within said predetermined temperature range.

5. An apparatus as specified in claim 4 additionally including third heating means in heat exchange relationship between said recirculating conduit and said directing means and operative to use the waste heat from the recirculating high pressure lean urea solution residue to raise the temperature of the rich urea solution being directed to said hydrolyzer assembly.

6. An apparatus as specified in claim 2 additionally including dilution means operative to reduce the concentration of the ammonia in the gaseous mixture containing ammonia prior to injection of the gaseous mixture into such exhaust gas stream.

7. An assembly for the supply of urea and the on-site manufacture of a gaseous mixture containing ammonia, from a rich urea solution, derived from such supply of urea, for injection into an exhaust gas stream to assist in the removal of air pollutants therefrom, comprising:

storage and processing means for storing a supply of urea and providing a rich urea solution;

pressurizing means for raising the pressure of such rich urea solution, to a predetermined high pressure rich urea solution;

directing means communicating between such pressurizing means and a staged hydrolyzer assembly;

each of said stages of said hydrolyzer assembly being operative to hydrolyze a portion of such high pressure rich urea solution to a high pressure gaseous mixture containing ammonia, and to leave a high pressure urea solution, less rich that the high pressure rich urea solution from the one of said stages upstream therefrom, and the last stage of said stages of said hydrolyzer having a high pressure lean urea solution residue exiting therefrom;

a recirculating conduit in communication with said last stage to recirculate at least a portion of high pressure lean urea solution residue, to the portion of storage and processing means which provides the rich urea solution;

delivery means operative to selectively withdraw a portion of such gaseous mixture from said hydrolyzer assembly for injection into an exhaust gas stream; and dilution means in communication with said delivery means and operative to dilute the concentration of ammonia in such gaseous mixture prior to the injection of such gaseous mixture into such exhaust gas stream.

8. An assembly as specified in claim 7 wherein said storage and processing means includes storage facilities for a dry urea feed stock and a dissolver assembly which is adapted to receive metered quantities of such dry urea feed stock, and to dissolve such metered quantities in a selected proportion of liquid, to produce such rich urea solution.

9. An assembly as specified in claim 8 wherein said delivery means includes an injection grid operative to assist in providing uniform injection of such gaseous mixture into such exhaust gas stream.

* * * * *